United States Patent [19]
Lademann et al.

[11] 3,786,685
[45] Jan. 22, 1974

[54] COMBINATION PERMANENT MAGNET TORQUER-EDDY CURRENT DAMPER FOR A GYRO

[75] Inventors: Ernest E. Lademann, Park Ridge; Ralph E. Iadarola, Roseland, both of N.J.

[73] Assignee: The Bendix Corporation, Teterboro, N.J.

[22] Filed: Sept. 28, 1971

[21] Appl. No.: 184,544

[52] U.S. Cl. .................................. 74/5.5, 73/430
[51] Int. Cl. ............................................ G01c 19/04
[58] Field of Search ........ 74/5.5, 5.46, 5.47; 73/430

[56] References Cited
UNITED STATES PATENTS

| | | | |
|---|---|---|---|
| 3,242,745 | 3/1966 | Romberg | 74/5.46 |
| 2,805,578 | 9/1957 | Wright | 74/5.5 |
| 2,682,773 | 7/1954 | Ward | 74/5.4 |
| 3,240,075 | 3/1966 | Ranes | 73/430 X |
| 2,916,919 | 12/1959 | Echolds | 74/5.46 |
| 2,900,825 | 8/1959 | Echolds | 74/5.47 X |
| 3,031,892 | 5/1962 | Krupick | 74/5.5 |

Primary Examiner—Manuel A. Antonakas
Attorney, Agent, or Firm—Anthony F. Cuoco; S. H. Hartz

[57] ABSTRACT

A permanent magnet torquer-eddy current damper for a gyro includes a copper cylinder supported for rotating with the gyro inner gimbal and a coil assembly mounted on the cylinder. The cylinder is disposed in the magnetic field and relative motion between the field and cylinder is damped to induce currents while torquing is provided through current in the coil assembly. Temperature compensating means are provided for damping and torquing stability.

3 Claims, 2 Drawing Figures

PATENTED JAN 22 1974    3,786,685

INVENTORS
ERNEST E. LADEMANN
RALPH E. IADAROLA
BY
ATTORNEY

COMBINATION PERMANENT MAGNET TORQUER-EDDY CURRENT DAMPER FOR A GYRO

BACKGROUND OF THE INVENTION

1. Field of the Invention

This invention relates generally to gyro damping and torquing functions and, particularly, to a combination device for performing said functions.

2. Description of the Prior Art

A need exists for a gyroscope having constant damping over large temperature extremes and operating in a closed torque to balance (analog or digital) mode for strapdown applications. Conventional type fluid damped instruments are not satisfactory due to the large non-linear viscosity vs. temperature characteristics of the damping fluid. Also since weight and size are of prime importance for the applications described separate torquing and damping devices are not satisfactory.

SUMMARY OF THE INVENTION

The damping function of the device of the invention operates on the principle that a conductor will have a current induced therein when it has a velocity relative to a magnetic field. Induced current causes the conductor to experience an orthogonal force proportional to the square of the flux density and the magnitude of the relative velocity normal to the flux density. The direction of the force is such as to oppose motion of the conductor.

The torquing function operates on the principle that a current carrying conductor in a magnetic field experiences a force at right angles to the direction of the current. If this current is forced rather than induced the direction of the force in the conductor can be in a desired direction. This effect is applied to providing a torquing force.

In order to accomplish the aforenoted damping and torquing functions a centrally disposed permanent magnet structure is separated by an air gap from a soft iron return path and a cylindrical copper cylinder supported for rotating with the gyro inner gimbal is disposed in the air gap. A plurality of coils are mounted on the copper cylinder. Relative motion between the magnetic field and cylinder is damped through induced currents and torquing is provided through the current in the coils.

One object of this invention is to provide a single device for accomplishing gyro gimbal damping and torquing functions.

Another object of this invention is to overcome the deficiencies of fluid damped gyros.

Another object of this invention is to provide a compact combination torquing and damping device to provide an instrument of reduced weight and size.

Another object of this invention is to provide a device for use with the gyro that generates gyro gimbal damping which is constant with temperature and provides restoring torque during rate inputs.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
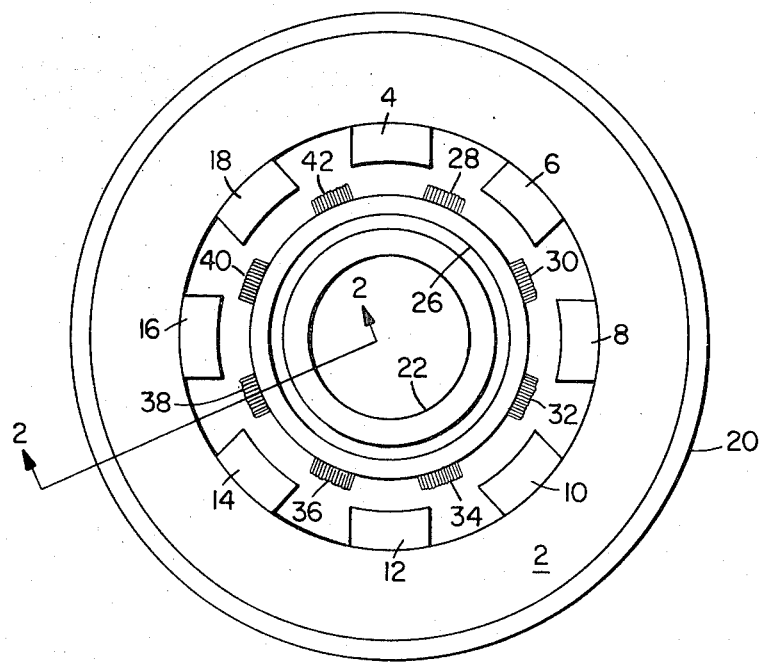
FIG. 1 is a top view of a device constructed according to the invention.
Figure 2:
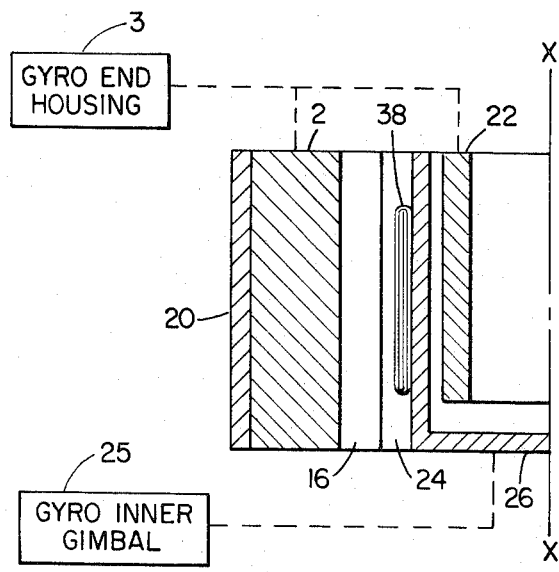
FIG. 2 is a section taken along line 2—2 of FIG. 1.

A permanent magnet stator 2 is mounted by suitable means to a gyro end housing 3. Stator 2 is a composite high energy Alnico cast magnet cylinder. Circumferentially mounted on the I.D. of the cylinder are a plurality of magnetic poles shown as eight in number and designated by the numerals 4–18. A temperature compensating ring 20 having a purpose as will be hereinafter described is mounted to the O.D. of permanent magnet cylinder 2.

An ARMCO iron cylinder 22 is mounted to gyro end housing 3 and serves as a return path for permanent magnet stator 2. Permanent magnet stator 2 and return path cylinder 22 are separated by a suitable air gap 24.

A solid copper cylindrical cup 26 is supported by the gyro inner gimbal 25 in air gap 24. A plurality of multiturn coils shown as eight in number and designated by the numerals 28–42 are circumferentially mounted on cup 26. Each of the coils is disposed between adjacent magnets 4–18.

It will now be understood that damping about the output axis of the gyro inner gimbal 25 is accomplished by cup 26 disposed in the magnetic field as shown in the drawings. As cup 26 rotates it cuts the lines of flux set up by the magnetic field and eddy currents are induced in the cup which tend to create a drag or damping effect proportional to the speed of the cup about the gimbal x—x axis. The torquing effect is accomplished through magnet 8, return path magnet 22 and coils 30–42 mounted on cup 26, with the torquing being produced by current in the coil assembly.

Temperature compensation ring 20 is of a suitable iron nickel alloy, with the nickel content controlled within specific limits to provide certain specific thermomagnetic properties as is well known in the art. Temperature compensation is provided by compensating ring 20 providing, in effect, a magnetic shunt for maintaining flux constant with temperature variations and which flux would otherwise vary.

It will be seen from the aforegoing description of the invention that the objects initially set forth have been met. A combination torquing-damping device is provided which provides constant damping with temperature stability and which operates in a closed torque to balance mode suitable for strapdown applications such as may be required in the aerospace field. Since damping fluids are eliminated, fluid viscosity vs. temperature characteristics are of no concern. Moreover since torquing and damping is combined in a single device, weight and size are optimized.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A combination torquer-damper device for a gyro having a gimbal which rotates about an axis, comprising:
- a hollow, cylindrical magnetic stator supported by the gyro and including a plurality of magnetic poles disposed circumferentially around the inside diameter of the stator;
- a magnetic return path member supported by the gyro and separated from the stator by an air gap;
- a hollow, cylindrical conductive member supported by the gimbal and rotating therewith, and disposed in the air gap; and
- a coil assembly supported by the conductive member and including a plurality of coils disposed circumferentially around the outside diameter of the conductive member, said coils being disposed between adjacent magnetic poles.

2. A device as described by claim 1, including:
- a temperature compensating element affixed to the stator and providing a magnetic shunt which maintains magnetic flux constant with variations in temperature.

3. A device as described by claim 1, wherein:
- a temperature compensating ring is affixed to the outside diameter of the cylinder and provides a magnetic shunt which maintains magnetic flux constant with variations in temperature.

* * * * *